United States Patent
Blake et al.

(10) Patent No.: US 10,489,292 B2
(45) Date of Patent: *Nov. 26, 2019

(54) OWNERSHIP TRACKING UPDATES ACROSS MULTIPLE SIMULTANEOUS OPERATIONS

(71) Applicant: INTERNATIONAL BUSINESS MACHINES CORPORATION, Armonk, NY (US)

(72) Inventors: Michael A. Blake, Wappingers Falls, NY (US); Timothy C. Bronson, Round Rock, TX (US); Ashraf ElSharif, Austin, TX (US); Kenneth D. Klapproth, Austin, TX (US); Vesselina K. Papazova, Highland, NY (US); Guy G. Tracy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,717

(22) Filed: Nov. 20, 2017

(65) Prior Publication Data
US 2018/0336135 A1    Nov. 22, 2018

Related U.S. Application Data

(63) Continuation of application No. 15/598,837, filed on May 18, 2017.

(51) Int. Cl.
*G06F 12/0817* (2016.01)
*G06F 12/0891* (2016.01)

(52) U.S. Cl.
CPC ...... *G06F 12/0817* (2013.01); *G06F 12/0891* (2013.01); *G06F 2212/1024* (2013.01); *G06F 2212/60* (2013.01); *G06F 2212/621* (2013.01)

(58) Field of Classification Search
CPC .... G06F 3/0656; G06F 3/0817; G06F 3/0891; G06F 13/15; H04L 12/66
See application file for complete search history.

(56) References Cited

U.S. PATENT DOCUMENTS

| 6,594,733 B1 * | 7/2003 | Cardente | G06F 12/0817 |
| | | | 711/141 |
| 6,718,839 B2 | 4/2004 | Chaudhry et al. | |

(Continued)

OTHER PUBLICATIONS

List of IBM Patents or Patent Applications Treated as Related; (Appendix P), Filed Nov. 20, 2017; 2 pages.

(Continued)

*Primary Examiner* — Gary W. Cygiel
(74) *Attorney, Agent, or Firm* — Cantor Colburn LLP; William Kinnaman

(57) ABSTRACT

Embodiments of the present invention are directed to a computer-implemented method for ownership tracking updates across multiple simultaneous operations. A non-limiting example of the computer-implemented method includes receiving, by a cache directory control circuit, a message to update a cache directory entry. The method further includes, in response, updating, by the cache directory control circuit, the cache directory entry, and generating a reverse compare signal including an updated ownership vector of a memory line corresponding to the cache directory entry. The method further includes sending the reverse compare signal to a cache controller associated with the cache directory entry.

6 Claims, 11 Drawing Sheets

(56) References Cited

U.S. PATENT DOCUMENTS

| | | |
|---|---|---|
| 6,981,106 B1 | 12/2005 | Bauman et al. |
| 7,500,068 B1* | 3/2009 | Lenoski .............. G06F 12/0817 |
| | | 709/213 |
| 8,533,399 B2 | 9/2013 | Ohmacht |
| 2010/0169581 A1* | 7/2010 | Sheaffer .............. G06F 12/0831 |
| | | 711/141 |
| 2016/0147661 A1 | 5/2016 | Ambroladze et al. |

OTHER PUBLICATIONS

Michael A. Blake et al."Ownership Tracking Updates Across Multiple Simultaneous Operations", U.S. Appl. No 15/598,837, May 18, 2017.

* cited by examiner

| Steps | P1 | | | P2 | | | Bus Action | | | | Directory | | | Memory Value |
|---|---|---|---|---|---|---|---|---|---|---|---|---|---|---|
| | State | Addr | Val. | State | Addr. | Val. | Action | Proc | Addr. | Val | Addr | State | Proc | |
| 1 P1: Write 10 to A1 | | | | | | | | | | | | | | |
| | EX | A1 | 10 | | | | Wr Miss | P1 | A1 | | A1 | EX | {P1} | |
| | EX | A1 | 10 | | | | Da Rp | P1 | A1 | 0 | | | | |
| 2 P1: Read A1 | | | | | | | | | | | | | | |
| 3 P2: Read A1 | | | | SH | A1 | | Rd Miss | P2 | A1 | | | | | |
| | SH | A1 | 10 | SH | A1 | 10 | Fetch | P1 | A1 | 10 | A1 | SH | {P1, P2} | 10 |

| Steps | P1 | | | P2 | | | Bus Action | | | | Directory | | | Memory Value |
|---|---|---|---|---|---|---|---|---|---|---|---|---|---|---|
| | State | Addr | Val. | State | Addr. | Val. | Action | Proc | Addr. | Val. | Addr | State | Proc | |
| 1 P1: Write 10 to A1 | | | | | | | Wr Miss | P1 | A1 | | A1 | EX | {P1} | |
| | EX | A1 | 10 | | | | | | | | | | | |
| 2 P1: Read A1 | EX | A1 | 10 | | | | Da Rp | P1 | A1 | 0 | | | | |
| 3 P2: Read A1 | | | | SH | A1 | | Rd Miss | P2 | A1 | | | | | |
| | SH | A1 | 10 | SH | A1 | 10 | Fetch | P1 | A1 | 10 | A1 | SH | | 10 |
| 4 P2: Write 20 to A1 | | | | EX | A1 | 20 | Wr Miss | P2 | A1 | | A1 | EX | {P1, P2} | 10 |
| | INV | | | | | | INV | P1 | A1 | | | EX | {P2} | 10 |

FIG. 9

OWNERSHIP TRACKING UPDATES ACROSS MULTIPLE SIMULTANEOUS OPERATIONS

DOMESTIC PRIORITY

This application is a continuation of U.S. Non-Provisional application Ser. No. 15/598,837, entitled "OWNERSHIP TRACKING UPDATES ACROSS MULTIPLE SIMULTANEOUS OPERATIONS", filed May 18, 2017, which is incorporated herein by reference in its entirety.

BACKGROUND

The present invention generally relates to computer technology, and more specifically, to tracking ownership updates across multiple simultaneous operations in a processor.

Modern computer packaging technology provides for a modular design that may be used in a variety of computer system products in conjunction with a computer memory. In one example, multiple processor cores may be packaged on a single module or chip die. In another example, multiple chip cores may be packaged with storage control function on a single module or chip die. The multiple processor cores employ a cache hierarchy on the module or chip die. Further, only a single core of the module or chip die may be used in a computer system. In one example, only a single such module or chip die may be used in a computer system. Alternatively, multiple such modules or chip dies may be used in a computer system. Each configuration above may require a different cache coherency protocol to efficiently perform desired function and performance.

SUMMARY

Embodiments of the present invention are directed to a computer-implemented method for ownership tracking updates across multiple simultaneous operations. A non-limiting example of the computer-implemented method includes receiving, by a cache directory control circuit, a message to update a cache directory entry. The method further includes, in response, updating, by the cache directory control circuit, the cache directory entry, and generating a reverse compare signal including an updated ownership vector of a memory line corresponding to the cache directory entry. The method further includes sending the reverse compare signal to a cache controller associated with the cache directory entry.

Embodiments of the present invention are directed to a system for ownership tracking updates across multiple simultaneous operations. A non-limiting example of the system includes a multiprocessor system including: a cache directory control circuit coupled with a plurality of processing nodes, each processing node including: a cache controller; and a processor coupled with the cache controller. The cache directory control circuit receives a message to update a cache directory entry. In response, the cache directory control circuit updates the cache directory entry. The cache directory control circuit also generates a reverse compare signal including an updated ownership vector of a memory line corresponding to the cache directory entry. The cache directory control circuit further sends the reverse compare signal to the cache controller associated with the cache directory entry.

Embodiments of the invention are directed to a computer program product for ownership tracking updates across multiple simultaneous operations, the computer program product comprising a computer readable storage medium having program instructions embodied therewith. The program instructions are executable by a processor to cause the processor to perform a method. In a non-limiting example the program instructions executable by a cache directory control circuit cause the cache directory control circuit to receive a message to update a cache directory entry; in response, update the cache directory entry, and generate a reverse compare signal including an updated ownership vector of a memory line corresponding to the cache directory entry. The cache directory control circuit also sends the reverse compare signal to a cache controller associated with the cache directory entry.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8 depicts an example state of a cache directory, according to one or more embodiments of the present invention;

FIG. 9 depicts an example state of a cache directory, according to one or more embodiments of the present invention;

Figure 1:
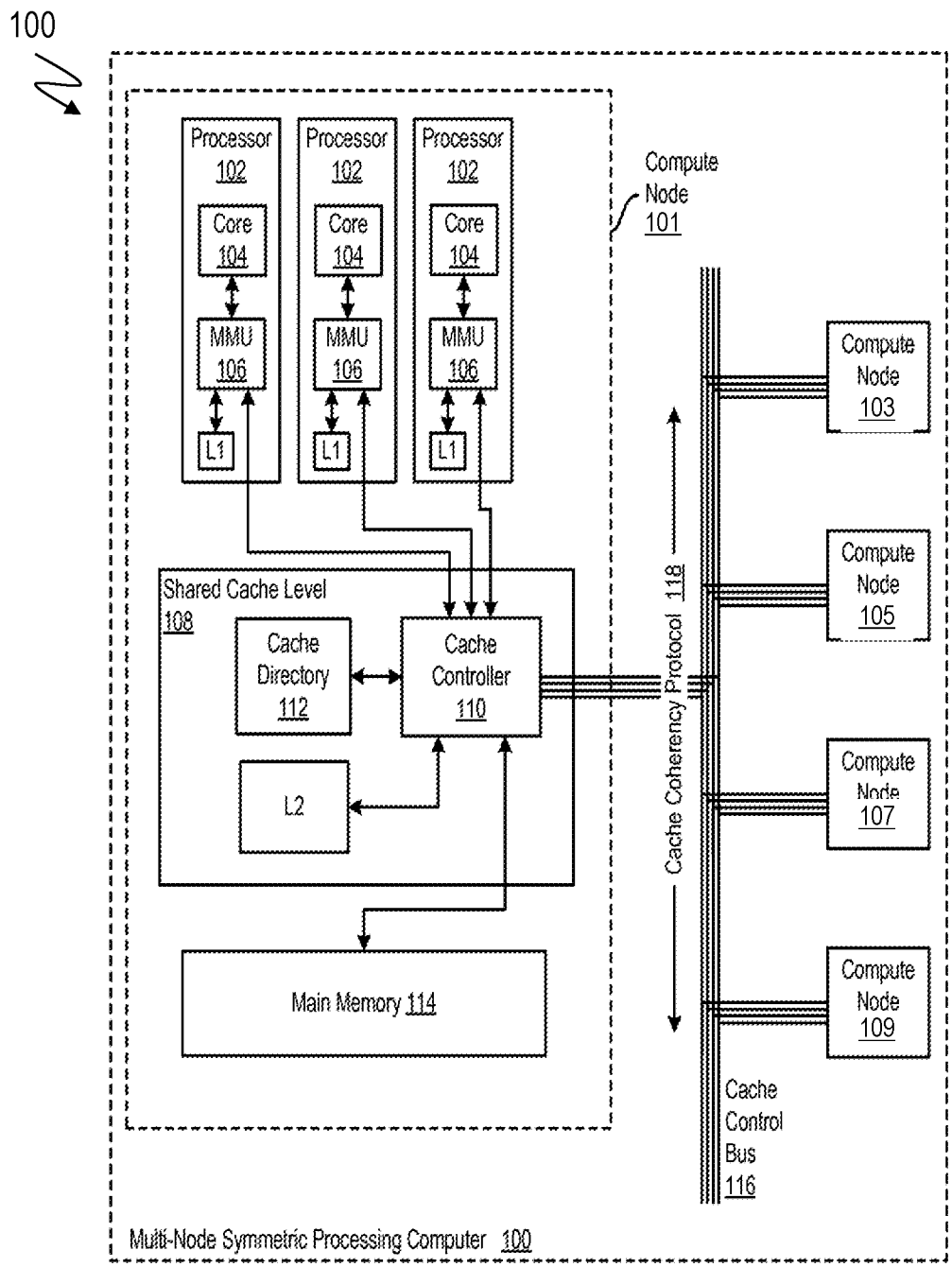
FIG. 1 depicts a functional block diagram of an example of a multi-node, symmetric multiprocessing computer that maintains cache coherence according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Typically, a method for maintaining cache coherence in a multi-node, symmetric multiprocessing computer, the computer composed of a plurality of compute nodes, includes, broadcasting upon a cache miss by a first compute node a request for a cache line. Further, the method includes transmitting from each of the other compute nodes to all other nodes the state of the cache line on that node, including transmitting from any compute node having a correct copy to the first node the correct copy of the cache line. The method further includes updating by each node the state of the cache line in each node, in dependence upon one or more of the states of the cache line in all the nodes. For example, see U.S. Pat. No. 8,423,736, which is incorporated by reference herein.

Alternatively, or in addition, in a computing system, cache coherency is performed by selecting one of a plurality of coherency protocols for a first memory transaction. Each of the plurality of coherency protocols has a unique set of cache states that may be applied to cached data for the first memory transaction. Cache coherency is performed on appropriate caches in the computing system by applying the set of cache states of the selected one of the plurality of coherency protocols. For example, see U.S. Pat. No. 8,402,225, which is incorporated by reference herein. Further, one or more multiprocessors and one or more external devices are interconnected through one or more configurable interface circuits, which are adapted for operation in: (i) a first mode to provide a coherent symmetric interface; or (ii) a second mode to provide a non-coherent interface. For example, U.S. Pat. No. 8,010,716, which is incorporated by reference herein, describes supporting multiple configurations in a multi-processor system.

For example, contemporary high performance computer systems, such as, for example, the z Systems® series of mainframes, are typically implemented as multi-node, symmetric multiprocessing ('SMP') computers with many compute nodes. SMP is a multiprocessor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which has at least some local memory, at least some of which is accelerated with cache memory. The cache memory can be local to each processor, local to a compute node shared across more than one processor, or shared across nodes. All of these architectures require maintenance of cache coherence among the separate caches.

In a traditional strong store ordered, symmetric multiprocessing computer system composed of many compute nodes, with the compute nodes interconnected through a given bus topology, with a coherence protocol that exchanges address, data, and coherency information, the release of a cache line and system resources by the protocol for completion of a memory/cache to cache operation does not occur until after a protracted series of communications is completed, including confirmation from all other caches on the other nodes that those caches have completed all coherency operations according to the protocol. Waiting for such confirmation before releasing the cache line and system resources represent additional latency in memory operations. In addition, in traditional protocols, even if the requesting node releases the line before receiving full confirmation, such protocols include additional communications regarding coherence state from the requesting node to the other nodes. Such additional communications represent additional latency in that the other nodes cannot be relied upon for additional coherency operations until all such confirmations are received by the requesting node.

FIG. 1 depicts a functional block diagram of an example of a multi-node, symmetric multiprocessing computer 100 that maintains cache coherence according to embodiments of the present invention. It should be noted that "Cache coherence," as the term is used here, generally indicates that a cache read by processor P to location X following a write by P to X, with no writes of X by any other processor between P's write and read instructions, always returns the value written by P. This requirement is a condition of program order preservation and is needed even in monoprocessor architectures.

Further, a cache read by processor P1 to location X following a write by another processor P2 to X must return the value written by P2 if no other writes to X are made by any processor between the two accesses. This condition defines a coherent view of cache memory. If processors can read the same old value after the write by P2, the cache is incoherent.

Further yet, cache writes to the same location must be sequenced. In other words, if location X received two different values A and B, in this order, by any two processors, the processors can never read location X as B and then read it as A. The location X must be seen with values A and B in that order.

Cache coherence in caches distributed across compute nodes is maintained by communications protocols called 'cache coherence protocols.' There are a number of cache coherence protocols, traditionally named according to the cache line states supported by the protocol. The MSI protocol, for example, supports following cache line states.

MODIFIED: A cache line in the MODIFIED cache line state has been modified in the cache. The data in the cache is then inconsistent with the backing store (e.g., main memory). A cache with a cache line in the "M" state has the responsibility to write the cache line to the backing store when the cache line is evicted.

SHARED: A cache line in the SHARED cache line state is unmodified and exists in at least one cache. The cache can evict the data without writing it to the backing store.

INVALID: A cache line in the INVALID state contains invalid data, and must be fetched from memory or another cache if the cache line is to be stored in this cache. Note that cache lines that are completely missing from a cache may also be characterized as INVALID in the cache.

Other cache coherency protocols may have different, fewer, and/or additional states. For example, the MESI protocol adds an EXCLUSIVE cache line state to the states of the MSI protocol, the MOESI protocol adds an OWNED cache line state to states of the MESI protocol, and so on. Thus, in computing, cache coherence is the consistency of shared resource data that ends up stored in multiple local caches.

The example computer 100 of FIG. 1 includes several compute nodes 101, 103, 105, 107, and 109. Although the example of FIG. 1 illustrates a computer 100 with five compute nodes, but this number five is only for ease of explanation, not for limitation of the technical solutions. Readers will recognize that SMP computers that maintain cache coherence according to embodiments of the present invention can have any number of compute nodes. The z10™ series of mainframe computers, for example, each can include up to 64 compute nodes or, in z10 terminology, "frames." Further, the Blue Gene® series of supercomputers can support thousands of compute nodes.

The diagram of one of the compute nodes 101 is expanded to illustrate the structure and components typical to all of the compute nodes. Each compute node includes a number of computer processors 102. The number of computer processors per compute node is illustrated here as three, but this is for ease of explanation, not for limitation. Readers will recognize that each compute node can include any number of computer processors as may occur to those of skill in the art. For example, a compute node in the z10™ series of mainframe computers can include up to 64 processors.

Each processor 102 in the example of FIG. 1 includes a compute core 104 that is coupled for memory operations through a memory management unit ('MMU') 106 and a cache controller 110 to two caches L1 and L2, and to main memory 114. L1 is a relatively small, high-speed cache fabricated into the processor itself. The MMU 106 includes address translation logic, a translation lookaside buffer, controls for the on-processor cache L1, and so on. The cache controller 110, with the L2 cache, a cache directory 112, and a cache control bus 116 bearing data communications among the compute nodes according to a cache coherency protocol 118, implements a shared cache level 108 across the nodes 101, 103, 105, 107, and 109 of the computer.

The main memory 114 is the principal, random access store of program data and program instructions for data processing on the computer 100. Main memory 114 is characterized by memory latency, the time required for a memory access, a read or write to or from main memory. In this example, main memory 114 represents a single extent of physical address space, but main memory is physically segmented and distributed across compute nodes, so that a main memory access from a processor on one compute to a main memory segment on the same node has smaller latency than an access to a segment of main memory on another compute node. This segmentation of main memory is described here for ease of explanation of relative effects on latency, not for limitation of the technical solutions. In other examples, the main memory can be implemented off-node entirely in a single, non-segmented set, separately from processors on nodes exclusively dedicated to main memory, and in other ways as will occur to those of skill in the art. However main memory is implemented, though, it is always much slower than a cache hit.

The caches L1 and L2 are specialized segments of memory used by the processors 102 to reduce memory access latency. Each cache is smaller and faster than main memory, and each cache stores copies of data from frequently used main memory locations. When a processor needs to read from or write to a location in main memory, it first checks whether a copy of that data, a "cache line," is in a cache.

If so, the processor immediately reads from or writes to the cache, which is much faster than reading from or writing to main memory. As long as most memory accesses are cached memory locations, the average latency of memory accesses will be closer to the cache latency than to the latency of main memory. As mentioned, main memory is much slower than any cache, and cache misses extract a heavy toll in memory access latency.

Cache memory is organized in blocks of data referred to as 'cache lines.' Each cache line may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the Contents of the cache line are stored in main memory.

In the example of FIG. 1, caches L1 and l2 implement a multi-level cache with two levels. Multi-level caches address the tradeoff between cache latency and hit rate. Larger caches have better hit rates but longer latency. To address this tradeoff many computers use multiple levels of cache, with small fast caches backed up by larger, relatively slower caches. Multi-level caches generally operate by checking the smallest Level 1 (L1) cache first; if it hits, the processor proceeds at high speed. If the smaller cache misses, the next larger cache (L2) is checked, and so on, before main memory is checked. The example computer of FIG. 1 implements two cache levels, but this is only for ease of explanation, not for limitation. In other examples, computers can implement additional levels of cache, three or even four cache levels, or more. Some processors implement as many as three levels of on-chip cache. For example, the ALPHA 21164™ has a 96 KB on-die L3 cache, and some of the Power® series machines have a 256 MB L3 cache off-chip, shared among several processors. In the example of FIG. 1, the L2 cache is shared directly among the processors on a compute node and among processor on all compute nodes through cache controller 110 on each node, the cache control bus 116, and the cache coherency protocol 118.

The cache directory 112 is a repository of information regarding cache lines in the caches. The cache directory 112 records, for each cache line in all of the caches on a compute node, the identity of the cache line or cache line "tag" and the cache line state, MODIFIED, SHARED, INVALID, and so on. The MMUs 106 and the cache controllers 110 consult and update the information in the cache directory with every cache operation on a compute node. The cache controller 110, connected directly to L2, has no direct connection to L1—and obtains information about cache lines in L1 from the cache directory 112. Thus, in a directory-based system, the data being shared is placed in a common directory that maintains the coherence between caches. The directory acts as a filter through which a processor asks permission to load an entry from the primary memory to its cache. When an entry is changed the directory 112 either updates or invalidates the other caches with that entry.

The cache controller 110 is a logic circuit that manages cache memory, providing an interface among processors 102, caches, and main memory 114. Although the cache controller 110 here is represented as being external to the processors 102, cache controllers can be integrated on modern computers directly into a processor or an MMU. In this example, the MMUs 106 include cache control logic for the L1 caches.

In one or more examples, the computer 100 may be referred to as a "cluster" of one or more compute nodes 101, 103, 105, 107, and 109 (each including one or more processor cores on a chip die for example) as the building block of different system structures. Each cluster may include a hierarchy of caches, for example the local (level 1) caches (L1/L2) associated with respective compute nodes 101, 103, 105, 107, and 109, and a cluster shared cache (L3), shared by all processing units 101, 103, 105, 107, and 109 of the cluster. Each cache system of a cluster may be configurable to manage coherency within the cluster 100, or to participate with other clusters of the system to manage coherency among multiple clusters. Each cluster may be packaged as a single chip die, a module comprising multiple chip dies, or other packaging apparatus known in the art. Each cluster may be an identical configuration or may be different configurations. For a first example, each cluster may comprise processor cores 101, 103, 105, 107, and 109. In a second example, one cluster may comprise six processor cores and another cluster may comprise four processor cores 101, 103, 105, 107.

Figure 2:
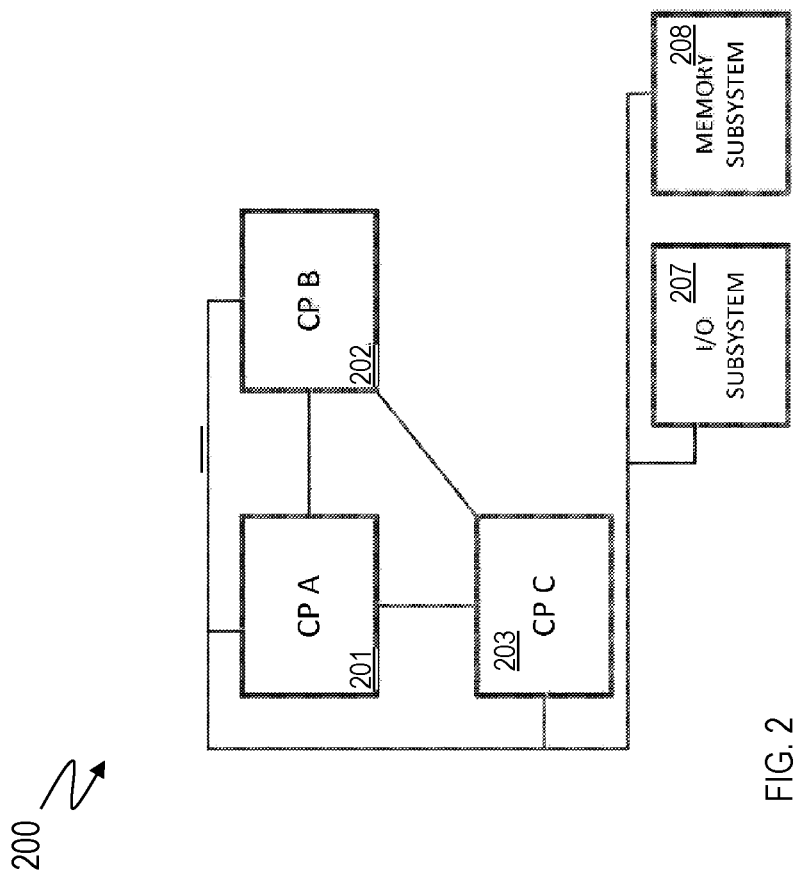
FIG. 2 depicts a system that includes multiple clusters a processing units, according to one or more embodiments of the present invention.

FIG. 2 depicts a system 200 that includes multiple clusters of processing units, according to one or more embodiments of the present invention. For example, the system 200 is depicted with three clusters 201, 202, and 203. In one or more examples, each cluster depicted is the SMP computer 100 described herein. It should be noted, that in other examples, the system 200 may include fewer, additional, or different clusters than those depicted. The clusters 201, 202, and 203 of the system 200 are communicatively coupled with the shared memory 208 and I/O system 207. In one or more examples, the multiple clusters may include a shared L3 cache. In one or more examples, the multiple clusters 100A-C of the system 200 may manage cache coherency cooperatively.

When clients in a system such as the single cluster 100, or a system 200 with multiple such clusters 201, 202, and 203, maintain caches of a common memory resource, technical problems may arise with inconsistent data. This is particularly true of central processing units (CPUs) in a multiprocessing system. For example, if a first client has a copy of a memory block from a previous read and a second client changes that memory block, the first client is left with an invalid cache of memory without any notification of the change. Cache coherence is intended to manage such conflicts and maintain consistency between cache and memory. In this example, the client can be computer program products executing on the cluster(s).

Figure 3:
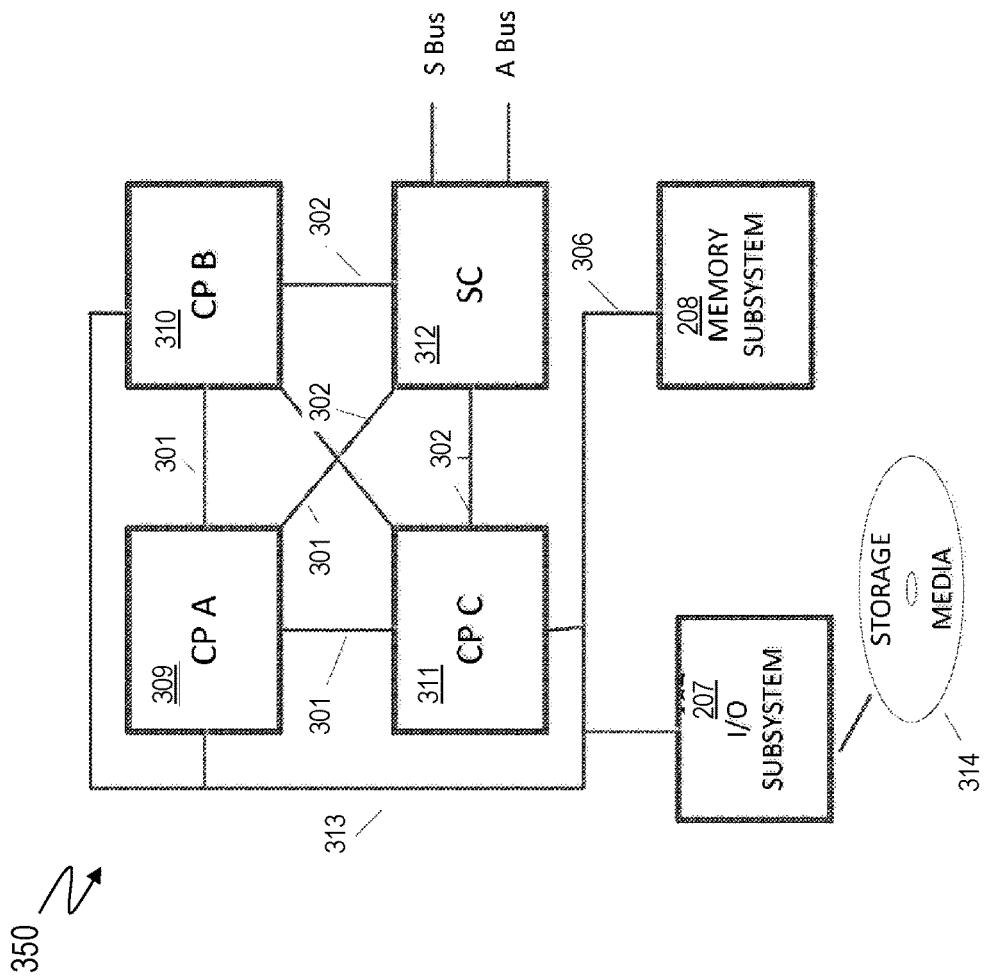
FIG. 3 illustrates another example system, according to one or more embodiments of the present invention.

FIG. 3 illustrates another example system 300, according to one or more embodiments of the present invention. In the depicted example, the system 300 includes clusters 309 to 311 and a storage control (SC) function 312. The clusters are interconnected (301) with each other and communicatively coupled (302) with the SC 312. The SC 312 includes a higher level cache (L4) shared by the clusters 309 to 311. The clusters 309 to 311 are further communicatively coupled 313 with the shared an I/O subsystem 207 and communicatively coupled 306 with a memory subsystem 208. In one or more examples, an interconnected plurality of clusters 309 to 311 and SC 312 may constitute a "node."

In one or more examples, the SC 312 includes an inclusive cache directory such that the SC 312 has knowledge of all lines of the node. In one or more examples, the inclusive cache directory function is distributed amongst the processors and may be implemented by the combined non-inclusive cache directories of all clusters of the node. The SC 312 may determine whether a cache access of the node can be handled entirely within the node (such as a processor of the node requesting ownership of a cache line already owned by a processor of the node), or that a cache access of the node must interrogate other nodes (such as a processor of the node requesting ownership of a cache line, not currently owned by the node). In one or more examples, the SC 312 function may be provided by cooperative logic of the processors 309 to 311 of the node. In this embodiment, the processors cooperate to determine if an access to an external node is required, and the requesting processor may then control coherency accesses to other nodes on behalf of the node. In another embodiment the SC 312 function may be provided by dedicated logic, perhaps in a separate chip die of the node for example.

In one or more examples, the system 300 includes a computer storage media 314.

Figure 4:
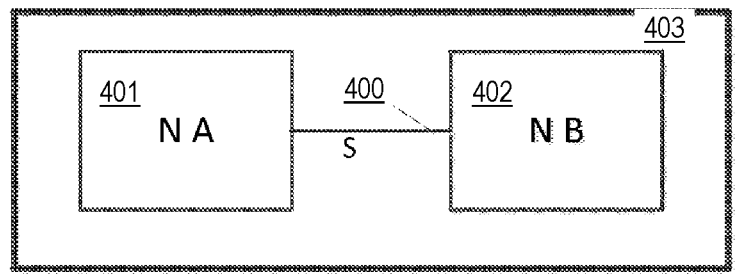
FIG. 4 depicts a system including multiple nodes, according to one or more embodiments of the present invention.

FIG. 4 depicts a system 403 including multiple nodes, according to one or more embodiments of the present invention. The system 403 includes one or more nodes 401, 402 that are packaged as a "drawer" and interconnected by an S-Bus 400. Each of the nodes 401 and 402 is the node 350 described herein.

Figure 5:
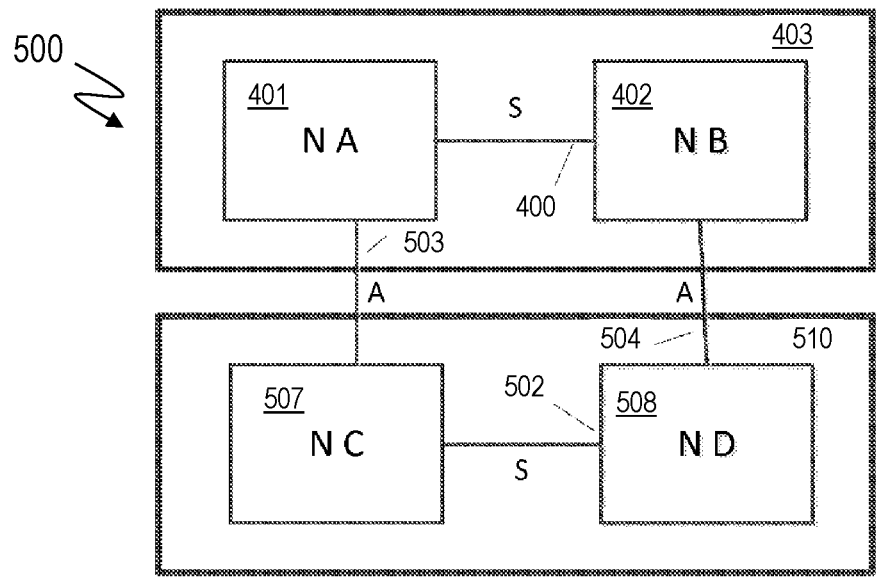
FIG. 5 depicts an example system according to one or more embodiments of the present invention.

FIG. 5 depicts an example system 500, according to one or more embodiments of the present invention. The system 500 includes multiple drawers, for example 403 and 510. It should be noted that although the depicted system 500 includes two drawers, in other examples, the system 500 includes additional drawers.

The nodes of the drawers 403 and 510 are communicatively coupled by a respective S-Bus 400 and 502 within the respective drawers 403 and 510. In one or more examples, each node of the first drawer 403 is communicatively coupled with a node of the second drawer 510, for example using an A-Bus. For example, an A-bus 503 connects the node 401 from the first drawer 403 and the node 507 from the second drawer 510. Alternatively, or in addition, an A-bus 504 connects the node 402 from the first drawer 403 and the node 508 from the second drawer 510. Intra node coherency communication may be performed using pass-thru and a combination of S-Bus and A-Bus links.

Figure 6:
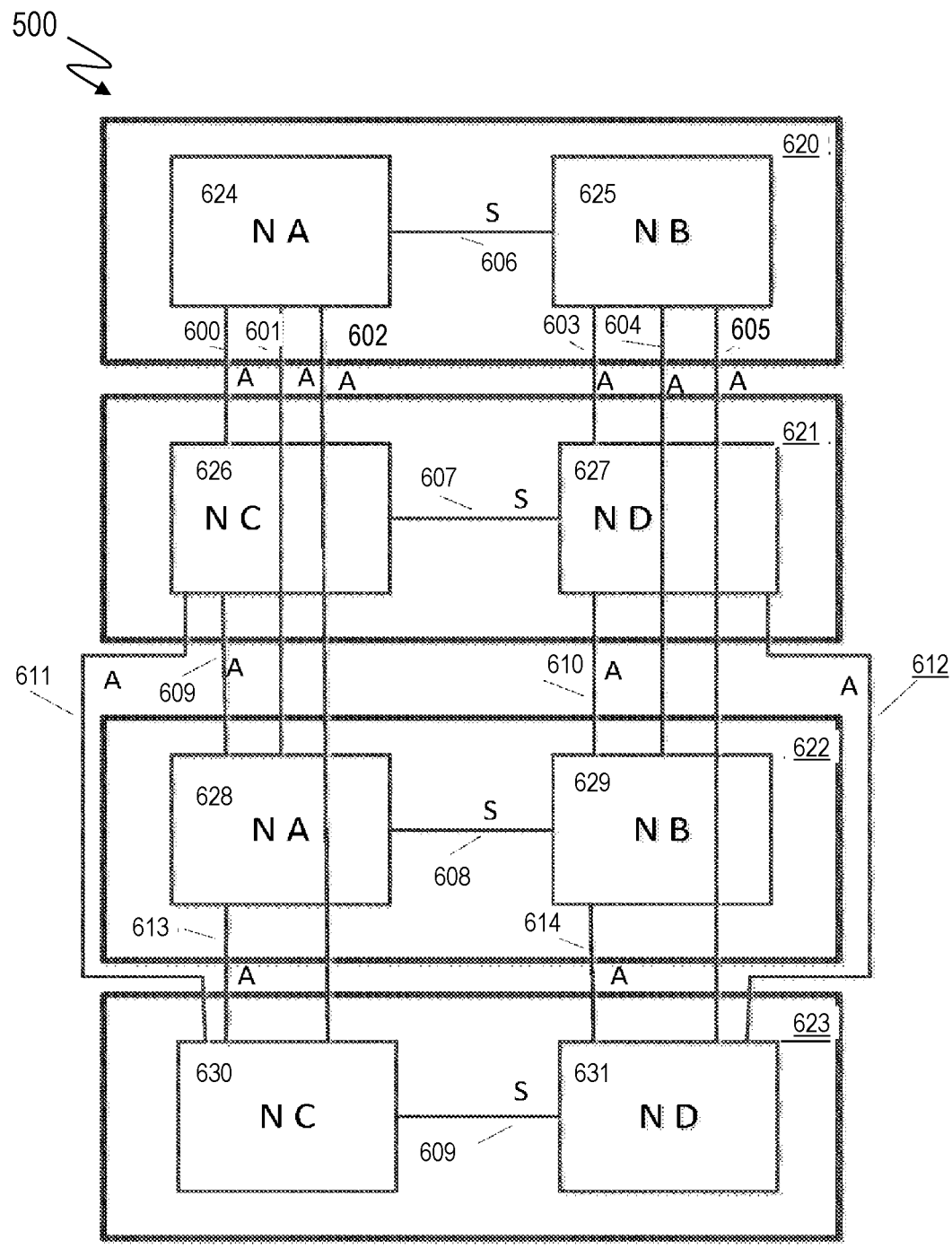
FIG. 6 depicts an example configuration of a system with multiple cache drawers, according to one or more embodiments of the present invention.

FIG. 6 depicts an example configuration of the system 500 with multiple cache drawers, according to one or more embodiments of the present invention. For example, separate A-Buses 600 to 605 and 611 to 614 are provided between nodes 624 to 631 of each drawer of a configuration, and on drawer nodes 624, 626, 628, 630 are communicatively coupled to other node(s) 625, 627, 629, 610 of the respective drawer via a corresponding on-drawer S-Bus 606, 607, 608, and 609. In one or more examples, nodes of a drawer may act as pass-thru paths for drawer to drawer communication. For example, only one set of drawer to drawer A-Busses are needed 600, 601, 602, and function provided by a second set of A-Busses 603, 604, 605 is provided by a node from the nodes 624, 626, 628, 630 by passing communications from the single set of A-Busses 600, 601, 602 of each drawer through respective S-Busses 606, 607, 608, 609 to other node(s) 625, 627, 629, 631.

In one or more examples, buses used to communicatively couple elements (dusters, nodes, drawers) are provided for direct communication. Thus, each element has a direct link to each other element. Alternatively, or in addition, one or more elements are communicatively coupled by providing a pass-thou function at an element to reduce the number of busses required. Buses may be unidirectional pairs, common bidirectional protocol or multi-drop busses for example.

In one or more examples, topology of a configuration is discovered by each cluster of a configuration, for example at configuration initialization time. When a cluster is powered on, signals may be transmitted over cluster interfaces in order to determine whether other dusters or support elements (SCs for example) are communicatively coupled to the signaling cluster. This may be performed by micro-code (firmware) of the cluster. Based on the signaling, the cluster records a configuration value that represents the cluster's view of the topology. For example, the cluster records a bit-significant value wherein each bit represents the state of a corresponding interface. Alternatively, or in addition, the configuration value represents the protocol to be used by the cluster.

For example, a cluster from a multi-cluster configuration (FIG. 6) records a configuration value indicating that interconnections to other clusters are active, while a single cluster configuration records a configuration value indicating no such interconnections are active.

Further, in one or more examples, an SC function of a node records a configuration value indicating whether interconnections to other nodes (on-drawer SC chip 606) or to nodes of other drawers (off-drawer SC chips 600, 601, 602) are active and set a configuration value indicating the drawer interconnectivity. Further, in multi-drawer configuration example (such as FIG. 6) having 2 nodes 624, 625 per drawer 620, a node 624 of a drawer 620 may determine that an S-Bus 600, 601, 602 is active to another node 625 of the drawer, and that three node A-Bus interfaces 600, 601, 602 are active to corresponding nodes 626, 628, 630 of three corresponding other drawers 621, 622, 623. A node 624 may also similarly determine that other nodes 627, 629, 631 of other drawers are communicatively coupled by a pass-thru function, for example, utilizing S-Bus 606, 607, 608, 619. In such a configuration a signal from a node 624 via Errs S-Bus 606 to another node 625 of the drawer 620 that returns a configuration value of the other node 625 indicating other nodes 627, 629, 631 of respective other drawers 621, 622, 623 are communicatively coupled to the other node 625, and accessible by a pass-thru function of the other node 625.

Thus, referring to FIG. 6, a fully configured SMP system 500 consists of four "drawers" 620 to 623, each including up to two nodes 624 625, 626 627, 628, 629, 630 631, Each node in the high-end configuration may consist of three processor (CP) chips 309 to 311 and one cache (SC) chip 312 as shown in FIG. 3.

Such a complex cache structure in the system 400 that encompasses multi-drawer, multi-cluster, and multi-level cache presents a technical challenge in maintaining accurate ownership tag of the line while allowing parallel access to the line. To improve system throughput in getting shared ownership of the line by multiple processors spread across different drawers, clusters, and chips, typically the designs try to minimize interlocks between requests. This presents a technical challenge in maintaining accurate ownership vector across multiple simultaneous operations. The technical solutions described herein address such technical problems.

Typically, there are two main approaches used to maintain accurate ownership of the line in cache. First approach includes serializing operations targeting the same line so only one controller, such as memory controller/cache controller can access a line at any given time. The second approach is allowing two or more controllers to get access to the line but then use read-modify-write sequence while updating the cache directory to reflect the new ownership state. The first approach adversely impacts performance throughput. The second approach creates challenges in keeping the line looked while the read-modify-write sequence completes and adds latency to directory updates which in turn hurts performance.

The technical solutions address the technical challenges and improve upon the performance of the system by facilitating multiple controllers to get access to a cache line simultaneously and make directory updates without using read-modify-write sequence and yet maintaining the accuracy of the ownership vector.

In a system with multiple nodes (described herein) where the cache controller 110 is loaded during directory lookups all the cache controllers 110 of each node 101 have visibility to critical information such as whether the directory 112 is being updated/invalidated and what is the new ownership vector of a cache line. Since the cache controller 110 does not know which cache line, in particular, is being updated/invalidated the cache controller 110 cannot make use of the available information. To address this deficiency, the technical solutions herein facilitate the main compare logic in the directory 112 to create a reverse compare signal, which is unique for every cache controller 110 attached to that directory 112. In one or more examples, the signal may be sent using a specific reverse compare signal line between the directory and the cache controllers 110. When a directory update/invalidate pipe pass takes place the reverse compare signal is activated to all cache controllers 110 that are loaded with the same cache line address. This allows those cache controllers that receive the signal to capture the latest directory state as a result of this pipe pass. Accordingly, when the cache controller 110 is ready to request entering the pipe and update the directory 112 it already has the up-to-date copy of the ownership vector as a base for its own update.

By capturing ownership vector during pipe passes the cache controller 110 is also able to expedite the processing castout store directory updates while allowing fetches to return data to other processors without having the need to interlock with other cache controllers processing the castouts. Further, the captured ownership vector information can also be used to skip pipe passes in cases where a cache controller 110 that would have invalidated a copy of the cache line in the directory 112 but instead, determined that another cache controller 110 has already invalidated the cache line. This helps reduce interlocks between read-only fetches, exclusive type operations, and cache castouts thus helping improve the performance of the system.

To facilitate such improvement, the directory access to the same cache line is passed in a way that allows the cache controllers 110 to observe other cache controllers' pipe passes prior to entering the pipe. In one or more examples the directory arrays have restrictions in how soon each entry can be re-accessed due to bank busy limitations, and this delay is used to the cache controllers 110 to observe other cache controllers' pipe passes.

Further, in one or more examples, in addition to frill address compare signals a partial reverse compare signals is used to indicate page compares for operations that are on page basis. This facilitates the cache controllers to use the reverse compare signal to capture page based pipe fields that help speed up operations by removing or limiting the need for interlocks. For example, IO store operations and Key operation use the reverse page compare to capture key field. This helps improve latency on IO Stores in the case when Key operations are in progress.

Thus, the one or more embodiments of the present invention facilitate simultaneous cache directory updates while maintaining the accuracy of the ownership. As a result of the technical solutions described herein, multiple operations gain or give up access to a cache line without the need of being serialized or performing read-modify write directory update sequence. Thus, the technical solutions described herein improve overlapping of operations targeting the same cache line by eliminating pipe passes or reducing the number of pipe passes needed to complete the operation.

Further yet, the one or more embodiments of the present invention facilitate achieving simultaneous cache line access while maintaining the accuracy of page key field. As a result, the need for extended interlocks between store operations and operations that update the key field targeting the same page as the store is reduced, compared to typical cache systems. Instead of waiting for key operations to update the key in the directory, the store operation captures the key field during the key operation pipe pass and proceeds with its directory update pipe passes using the new key field.

Figure 7:
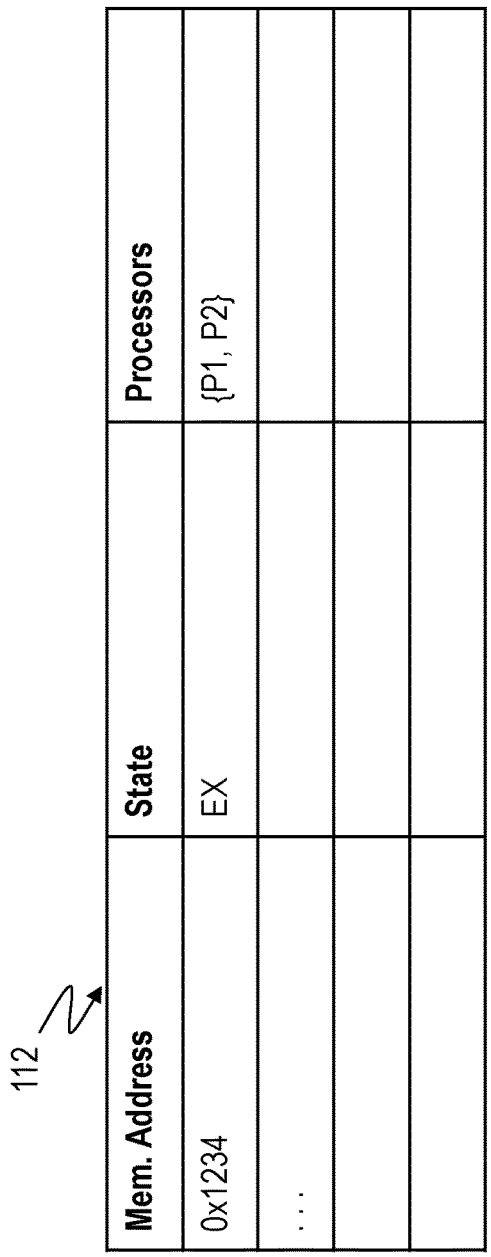
FIG. 7 depicts an example cache directory according to one or more embodiments of the present invention.

FIG. 7 depicts an example cache directory 112 according to one or more embodiments of the present invention. The cache directory 112 includes multiple cache directory entries. Each directory entry corresponds to, or is associated with, a memory line. In one or more examples, the directory 112 for a node's memory subsystem includes one directory entry for each "memory line" in the memory system. A "memory line" is the unit of memory that fits into one cache line of the cache modules, such as the L1 cache modules and L2 cache modules. The directory entry includes an address of the memory line to which the directory entry corresponds.

Each directory entry further includes a state field. For example, the state field is set to one of the defined states used by the cache coherence protocol, such as uncached (UNC), exclusive (EXCL), shared (SH), and so on. The directory entry further includes a list of processors (or nodes) that have or may have a copy of the corresponding memory line.

In the case of the directory based cache coherence the three possible directory requests include write-miss, read-miss, and data write-back.

For example, in case of read miss: owner processor sent data fetch message, which causes state of memory line in owner's cache to transition to shared and causes owner to send data to directory, where it is written to memory & sent back to requesting processor. The identity of requesting processor is added to set Sharers, which still contains the identity of the processor that was the owner (since it still has a readable copy).

In the case of a data write-back: owner processor is replacing the memory line and hence writes a new value back. This makes the memory copy up-to-date (the home directory essentially becomes the owner), the block is now uncached, and the Sharer set is empty.

In the case of a write miss: memory line has a new owner. Accordingly, a message is sent to old owner causing the cache to send the value of the block to the directory from which it is sent to the requesting processor, which becomes the new owner. Sharers (a vector that identifies a list of processors sharing the memory line) is set to identity of new owner, and state of block is made Exclusive.

FIG. 8 depicts an example state of the cache directory 112, according to one or more embodiments of the present invention. Consider a multiprocessor system with two processors P1 and P2. FIG. 8 depicts a cache state of the processor 810, a cache state of the processor P2 820, actions taken on a memory bus 830, a directory state 840, and a memory value 850, during a series of steps. In the example scenario herein, the steps in the series include P1 writing a value (e.g. 10) to a memory address A1, P1 reading the value from A1, and subsequently P2 reading a value from A1. In FIG. 8, the steps illustrate changes to each of the states 810-850 during for each step in bold font face. As can be clearly seen from FIG. 8, and as is described herein, a directory entry in the cache directory 112 maintains information to determine which processors have a copy of a memory address, and current state of the cache line. At the end of the above sequence of steps, both P1 and P2 have a copy of the value of A1 in a shared state.

Now consider, that in next step, P2 writes a different value (e.g. 20) to A1, subsequent to the sequence of the steps above. FIG. 9 depicts an example state of the cache directory 112, according to one or more embodiments of the present invention. As can be seen, the write from P2 to A1 causes a write miss at P2, and subsequently an invalidation of the copy of A1 at P1 and in the directory indicates that P2 has exclusive access to A1.

It should be noted that although the above example describes a multiprocessor system with two processing nodes P1 and P2, in other examples the multiprocessor system can include more number of processing nodes. Further, in the above example, each processing node P1 and P2 include a single processor, however, in other examples, the processing nodes can include additional number of processors.

The technical solutions described herein improve the cache operations by capturing ownership vector of the cache line being affected during pipe passes and expediting the processing of the castout store directory updates while allowing fetches to return data to other processors without having the need to interlock with controllers processing the castouts. This information can also be used to skip pipe passes in cases where cache controllers 110 need to invalidate the copy of the cache line in the directory 112 but they saw another controller already invalidated it (see above example). This helps reduce interlocks between read-only fetches, exclusive type operations, and cache castouts, which in turn helps improve performance of the multiprocessor system. A castout store is a process of writing changed data that is in the cache structure to memory, such as permanent storage.

Figure 10:
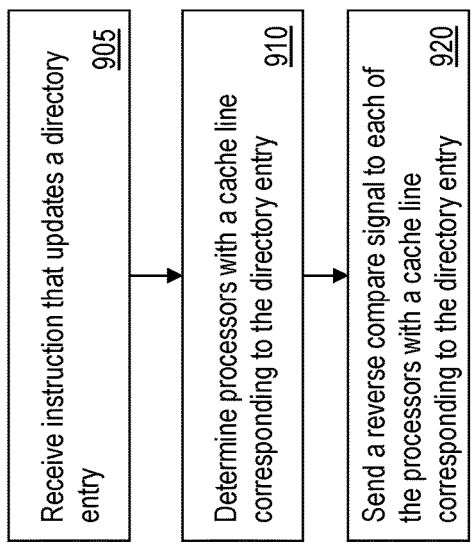
FIG. 10 illustrates a flow chart of an example method for a cache directory control circuit to send a unique reverse compare signal to corresponding processors of the multiprocessor system, according to one or more embodiments of the present invention.

FIG. 10 illustrates a flow chart of an example method for the cache directory 112 to send a unique reverse compare signal to corresponding processors of the multiprocessor system, according to one or more embodiments of the present invention. In one or more examples, a controller and/or electronic circuit, such as a cache directory control circuit, operating the cache directory 112 implements the method. The method includes receiving, by the cache directory 112, an instruction that updates the cache directory 112, as shown at 905. The cache directory 112 determines the processors that have a cache line corresponding to the directory entry being updated, as shown at 910. For example, in the above scenario, after step 3, the processors P1 and P2 would be identified. The cache directory 112 can determine the processors based on the directory entry (see FIG. 7). Further, cache directory 112 sends the corresponding reverse compare signals to the respective processors that are identified, as shown at 920. For example, in the above scenario, during execution of the step 4 in which the directory is updated, the reverse compare signals are sent to the processors P1 and P2.

The reverse compare signal to a processor includes the memory address of the directory entry. The signal further includes the updated ownership vector that identifies the processors that will have access to the memory line as a result of the update. For example, in the above scenario, P2 will be processor with exclusive access to A1; accordingly, the reverse compare signal includes the updated ownership vector indicative of the updated ownership.

The cache controller 110 of the receiving processor uses the address from the received reverse compare signal to identify the cache line and updates the cache line according to the updated ownership vector from the reverse compare signal in one or more examples, the reverse compare signal may include a partial memory address, for example for page compares for operations that are on page bases. Further, the receiving processor can optimize its operation based on the updated ownership vector and state of the memory line. For example, the processor can determine whether to proceed with an instruction that updates the cache directory 112 or to skip the instruction, thus avoiding a pipe pass.

Figure 11:
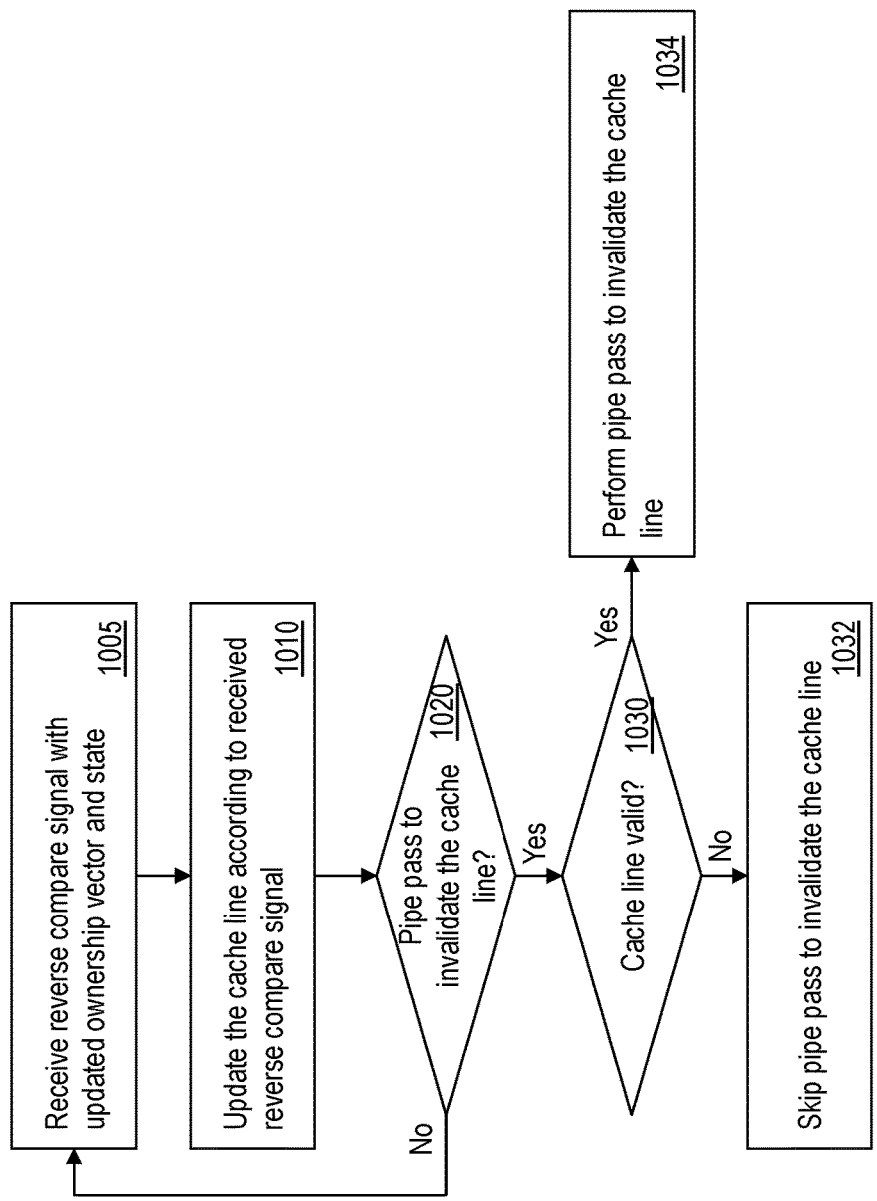
FIG. 11 illustrates a flow chart of an example method for a processor to skip a pipe pass, according to one or more embodiments of the present invention.

FIG. 11 illustrates a flow chart of an example method for a processor to skip a pipe pass, according to one or more embodiments of the present invention. In one or more examples, the cache controller 110 implements the method. As described above, the processor (or a node 101) receives the reverse compare signal with updated ownership vector and state, as shown at 1005. The cache controller 110 updates the cache line corresponding to the received reverse compare signal, as shown at 1010. For example, the cache controller 110 compares the memory address or page address included in the reverse compare signal to identify the cache line to be updated. Further, the cache controller 110 updates the ownership vector and state of the cache line according to the information included in the reverse compare signal. The processor and cache controller 110 continue to operate until the cache controller 110 is instructed to invalidate the cache line, for example because of an operation being executed by the processor, as shown at 1020.

The cache controller 110 checks the updated information in the cache line to determine if the cache line is valid, as shown at 1030. For example, if the another processor/cache controller had already invalidated the cache line, the update in response to the reverse compare signal already identifies that the cache line is invalid. Accordingly, if the cache line is already invalidated, the cache controller 110 skips the pipe pass to invalidate the cache line, as shown at 1032. Else, if the cache line was not invalidated earlier, and the status of the cache line is valid, the cache controller 110 proceeds to send a request to the cache directory 112 to update the status of the memory line according to the processor operation, and invalidate the directory structure, as shown at 1034. The cache directory 112, in response generates and sends reverse compare signals to the processors associated with the memory line (FIG. 10).

By skipping the pipe passes in case the memory line is invalidated earlier, the technical solutions herein reduce interlocks between read-only fetches, exclusive type operations, and cache castouts which in turn helps improve performance of the multiprocessor system.

Further, the performance of the processor nodes and/or cache controllers 110 is improved by the technical solutions herein by reducing extended interlocks between store operations and operations that update the key field targeting the same page as the store. For example, typically, a store operation is issued by P1 for storing data to a memory line in a specific page has to wait for completion of a key operation issued by P2 for data from the same specific page. A key operation is any operation that affects the key field, that is the ownership vector in the directory 112. The technical solutions herein facilitate the store operation to, instead of waiting for key operations to update the key in the directory, to capture the key field, which contains the updated ownership information, during the key operation pipe pass and proceed with the directory update pipe passes using the new key field.

Figure 12:
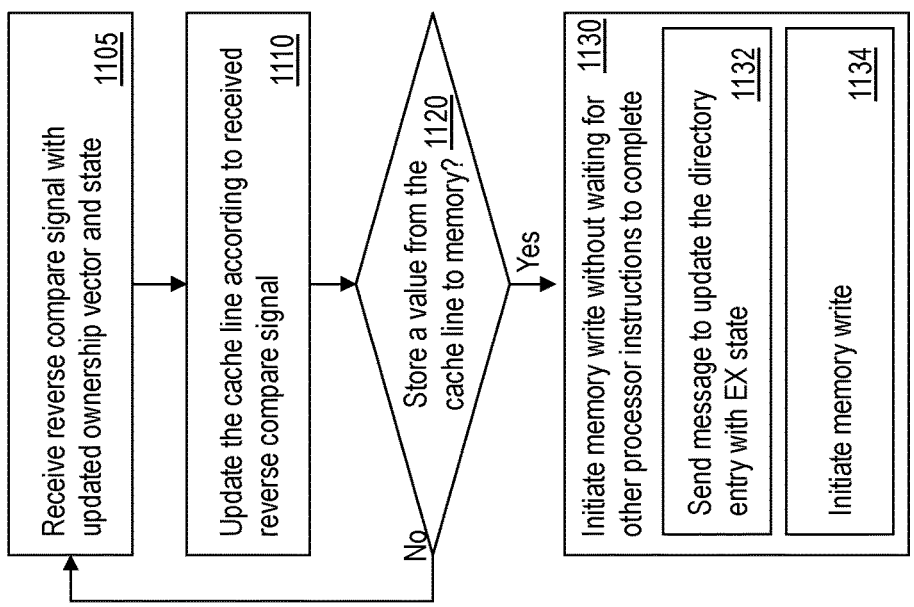
FIG. 12 illustrates a flow chart of an example method for reducing extended interlocks for store operations, according to one or more embodiments of the present invention.

FIG. 12 illustrates a flow chart of an example method for reducing extended interlocks for store operations, according to one or more embodiments of the present invention. The cache controller 110 of a processing node, such as node 101, implements the method depicted. Thus, in turn, the processing node 101 implements the method depicted. The method includes receiving, by the cache controller 110, the reverse compare signal from the cache director 112 with updated ownership vector and state of a memory line, as shown at

1105. The cache controller 110 updates the corresponding cache line according to received reverse compare signal, as shown at 1110. For example, the cache controller 110 compares We memory address or page address included in the reverse compare signal to identify the cache line to be updated. Further, the cache controller 110 updates the ownership vector and state of the cache line according to the information included in the reverse compare signal. The processor and cache controller 110 continue to operate until the cache controller 110 is instructed to write a value from the cache line into the corresponding memory location, for example because of an operation being executed by the processor, as shown at 1120.

If the processor node 101 has to store a value from the cache line to memory, it does not have to wait for directory updates from other processor nodes to complete. Instead, the processor node 101, via the cache controller 110 initiates the memory write without waiting for other processor instructions, and/or directory updates to complete, as shown at 1130. The cache controller 110 can do so by sending a message to the cache directory 112 to update the directory entry with EX state for the cache controller 110, as shown at 1132.

Accordingly, as a result of implementing the technical solutions herein, multiple operations can gain or give up access to a cache line without the need of being serialized or performing read-modify write directory update sequence. The technical solution thus improves overlapping of operations targeting the same cache line and/or memory line by eliminating pipe passes or reducing the number of pipe passes needed to complete the operation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a cache directory control circuit, a message to update a cache directory entry and responsively:
   identifying a first ownership vector of a memory line corresponding to the cache directory entry, the first ownership vector indicating one or more cache controllers that are associated with the cache directory entry;
   updating the cache directory entry;
   generating, by the cache directory control circuit, a reverse compare signal comprising an updated ownership vector of the memory line corresponding to the cache directory entry, and an address of said memory line; and
   sending, by the cache directory control circuit, the reverse compare signal to each cache controller in the first ownership vector associated with the cache directory entry prior to the cache directory entry being updated.

2. The computer-implemented method of claim 1, wherein the cache controller is a plurality of cache controllers associated with the cache directory entry.

3. The computer-implemented method of claim 1, wherein the reverse compare signal further comprises a memory address associated with the cache directory entry.

4. The computer-implemented method of claim 1, wherein the message to update the cache directory entry is part of a key operation, the key operation being an operation that changes the ownership vector of the cache directory entry.

5. The computer-implemented method of claim 1, further comprising:
   identifying, by the cache controller, a cache line associated with the reverse compare signal; and
   updating, by the cache controller, the cache line based on the updated ownership vector from the reverse compare signal.

6. The computer-implemented method of claim 5, further comprising:
   in response to receiving an instruction to invalidate the cache line by the cache controller, checking a state of the cache line that is updated according to the reverse compare signal, and in response to the state of the cache line being invalidated, skipping the instruction to invalidate the cache line.

* * * * *